United States Patent [19]

Macall

[11] 3,816,741

[45] June 11, 1974

[54] INFRARED SCANNING SYSTEM

[75] Inventor: Thomas F. Macall, Sunnyvale, Calif.

[73] Assignee: Midland Capitol Corporation, New York, N.Y.

[22] Filed: Aug. 4, 1971

[21] Appl. No.: 169,004

[52] U.S. Cl. ............................................. 250/347
[51] Int. Cl. ............................................. G01t 1/16
[58] Field of Search .................. 250/83.3 H; 356/51

[56] References Cited
UNITED STATES PATENTS

| | | | |
|---|---|---|---|
| 3,529,164 | 9/1970 | Komatsubara et al. | 250/83.3 H |
| 3,537,795 | 11/1970 | Clerc | 250/83.3 H |
| 3,624,400 | 11/1971 | Cohen | 250/83.3 H |
| 3,659,942 | 5/1972 | Vergato | 250/83.3 H |

Primary Examiner—James W. Lawrence
Assistant Examiner—Davis L. Willis
Attorney, Agent, or Firm—Weingarten, Maxham & Schurgin

[57] ABSTRACT

An optical scanning system particularly suited to detecting infrared radiation and selectively operative either as a camera or as a microscope in response to a simple adjustment. A single folded optical system is employed having a multiply reflecting horizontal scanning mirror oscillatory about a first axis to provide line scanning, and a vertical scanning mirror oscillatory about an orthogonal axis at a lower frequency to provide frame scanning. The focal point of the optical path is fixed while the field of view can be rotated in elevation or azimuth so that an orientation sensitive infrared detector may conveniently be used at the focal point. The oscillatory motion of each scanning mirror is preferably achieved by balanced forces oppositely acting at opposed edges of the scanning mirrors for providing efficient linear scanning with minimum bending distortion.

21 Claims, 7 Drawing Figures

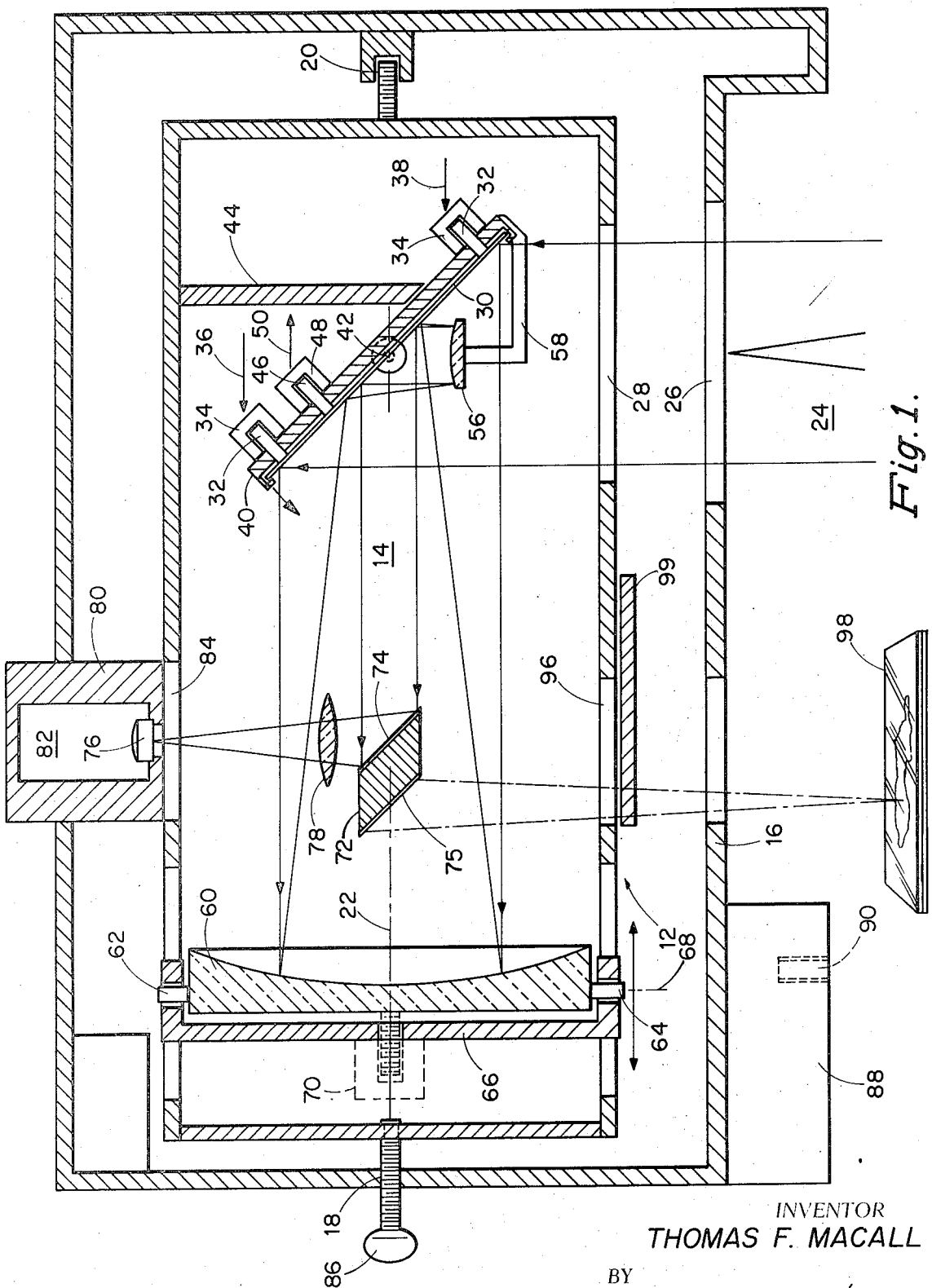

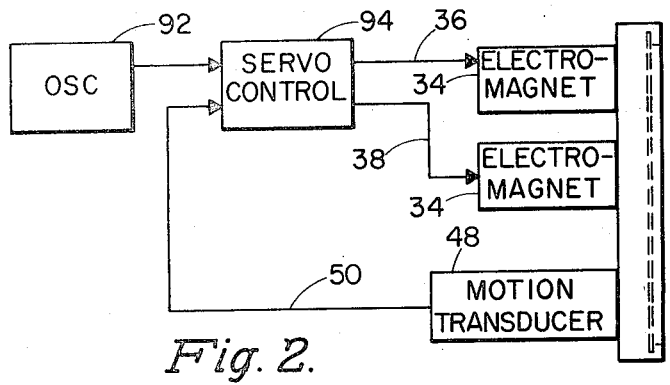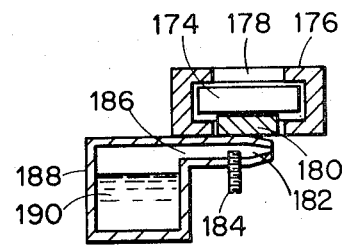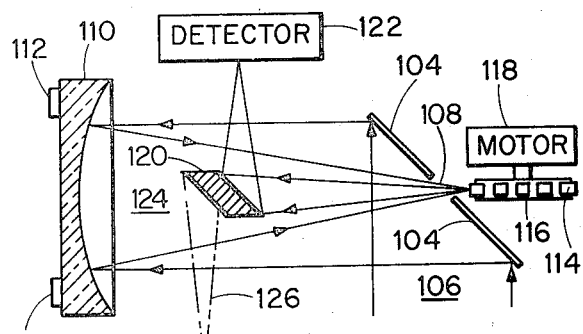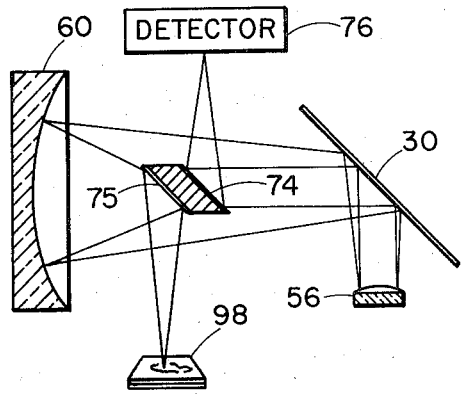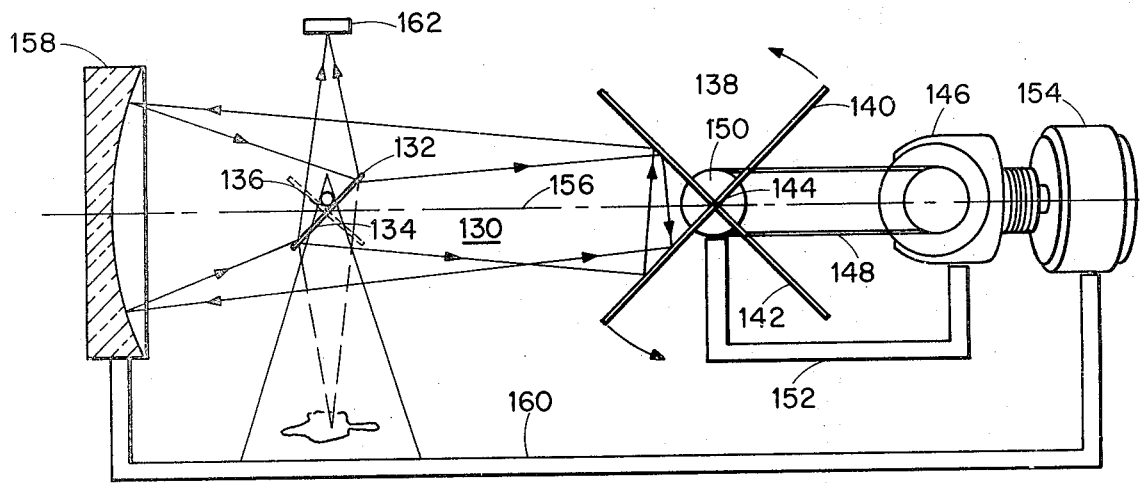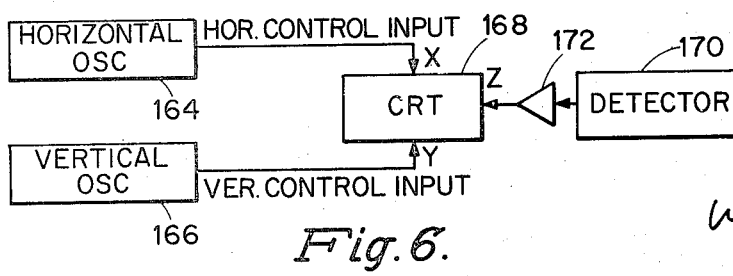

INFRARED SCANNING SYSTEM

FIELD OF THE INVENTION

This invention relates to optical scanning systems and more particularly to an infrared optical system adapted for rapid, selective scanning as either a camera or a microscope over a wide field of view or narrow field of view.

BACKGROUND OF THE INVENTION

Infrared radiation emanating from a variety of objects has become a significant source of information concerning properties of these objects. While it is possible to detect this radiation using infrared sensitive photographic film, cryogenically cooled, electro-optical infrared detectors scanned across a field of view, are more attractive by reason of their increased sensitivity and their ability to instantaneously produce a representation of infrared radiation received from an object. An existing disadvantage of cryogenically cooled detectors, however, is the requirement that they be kept in one orientation to prevent spillage of the cooling liquid.

Moreover, a scanning system must be employed for such detectors to cause radiation to be received from a succession of points that comprise a solid angle of view, and this correspondingly adds complexity and additional problems. In order to provide the necessary scanning of a succession of points within a field of view, rotary mirror wheels or prisms have been used to provide variation in the angle of incidence of detected radiation. More recently, systems of vibratory optics have been developed to provide, through oscillation of one or more optical elements, the scanning function previously accomplished by rotating mirrors or prisms. While the latter is more compact and convenient to use, it is limited in scanning speed because of problems in providing vibratory motions which are identical from one scan to the next and because of the tendency of the vibrated element to flex or otherwise distort its optical properties with resulting degradation of the optical image.

Further difficulties are provided by the need to adapt to a variety of applications for infrared detection which include the detection of infrared radiation from microscopic sources such as semiconductor units as well as the detection of radiation from relatively large, remote objects normally encountered in a camera field of view. The optics needed to provide camera and microscope operation are different in structure and optical path making it difficult or expensive to provide one infrared detection system capable of detecting radiation in both camera and microscope modes. For example, one way to provide both operations in a single instrument would include the provision of a plurality of optical systems which are selectively positioned in or out of the path between an object and the detector. The provision of duplicate optics becomes expensive, particularly where the optics must be adapted to provide scanning of successive points within the field of view. A further approach would be to provide an adjustment among the elements in the optics so as to change the magnification power and range of focus, such as provided by a variable focal length lens. Such lenses, however, are expensive and often difficult to adjust and hold in proper adjustment because of the complex relationships in focusing optics.

SUMMARY OF THE INVENTION

In accordance with the present invention, a scanning infrared detection system is provided in which rapid scanning of either a wide, camera filed of view or a narrow, microscope field of view is accomplished with a single, highly folded optical path. The optical path includes first and second scanning mirrors arranged to provide orthogonal scanning of a field of view. Each scanning mirror is supported by an electromechanical scanning mechanism operative in conjunction with electronic circuitry to provide feedback controlled, balanced forces oppositely acting at opposite edges of scanning mirrors which result in efficient, linear scanning motions that produce minimum bending distortion. The scanning mirror which is to operate at the higher rate to provide line scanning is positioned in the optical path to have a plurality of light reflections from its surface so as to amplify the effect of its oscillation and reduce the amount of mirror travel necessary for scanning a given field of view.

Both a camera or microscope field of view are provided by the same optical system without alteration of the relative spacing of the elements in the optical path. This is accomplished by altering the position, in the optical path, of the objective optical element of the system to place it either relatively closer to the detector or to the microscopic specimen or object.

The configuration of the folded optical path and the points at which the camera and microscope fields of view are directed into the optical path allows the camera field of view to be rotated 360 degrees without disturbing the orientation of the radiation detector, and making for increased flexibility in the use of a cryogenically cooled, high sensitivity detector.

DESCRIPTION OF THE DRAWINGS

The invention will be more fully understood from the following detailed description taken in conjunction with the accompanying drawings, in which:

FIG. 1 is a view partly pictorial and partly in section of the scanning system along a section cut containing the optical axis of the folded optics of the scanning system;

FIG. 2 is a block diagram of the electronic driving control circuitry for the scanning mirrors of the invention;

FIG. 3 is a diagrammatic view of the optical scanning system of the present invention in a mode for detecting radiation from a microscopic object or specimen;

FIG. 4 is a diagrammatic view of an alternative system for scanning radiation in a camera or microscope operation by using a plurality of high speed scan mirrors positioned around the periphery of a rotating drum;

FIG. 5 is a diagrammatic view of a further alternative system for scanning radiation in a camera or microscope operation by using a paddle wheel scanning mirror in a similar folded optical path;

FIG. 6 is a block diagram of electronic means for displaying on a cathode-ray-tube an image representing infrared radiations from an object as detected by the invention; and FIG. 7 is a section view of an alternative cooling system for an infrared detector employed in the invention.

DETAILED DESCRIPTION OF THE PREFERRED EMBODIMENT

Referring to FIG. 1 there is shown a view, partially pictorial and partially in section, of an exemplary infrared radiation optical scanning system according to the invention. A frame 12 generally surrounds optical path 14 and is rotatably secured in a housing 16 through pivots 18 and 20 on opposite ends of the frame 12 and on optical axis 22 of the optical scanning system.

For operation as a camera, a field of view 24 is provided through respective openings 26 and 28 in the housing 16 and frame 12. The opening 26 in the housing 16 is provided to allow 360° rotation of the frame 12 about the pivots 18 and 20 without obstructing the opening 28 in the frame 12.

A circular horizontal scanning mirror 30 is positioned within the frame 12 to receive radiations incident through openings 26 and 28 over the field of view 24 on a plane reflecting surface thereof at approximately a 45° angle to the field of view 24. The approximate center of the mirror 30 intercepts the optical axis 22 and is inclined thereto at approximately a 45° angle placed so as to be in the angle of reflection of radiations incident upon the mirror 30 over the field of view 24.

Light weight magnetic bars 32 extend away from the non-reflecting surface of the mirror 30 from opposite edges thereof. The bars 32 are attached to the mirror 30 at points where a plane containing the optical axis 22 and a center line of the field of view 24 intercepts the mirror 30. Surrounding the bars 32 are electromagnetic coils 34 receiving electrical excitation on respective inputs 36 and 38. A force is exerted on the bars 32 by electrical excitation through the coils 34 in a direction dependent upon the polarity of excitation.

The coils 34 are secured to a frame 40 which further restrains the mirror 30 to a limited angle through which it may be oscillated about an axis 42 along the reflecting surface of the mirror 30 and perpendicular to the sheet of FIG. 1. As diagrammatically indicated in FIG. 1, a mount 44 secures the frame 40 to the frame 12.

A bar 46 of lightweight magnetized material is attached to the mirror 30 between the bars 32 and similarly oriented. A magnetic pick-up coil 48 surrounds the bar 46 and produces at an output 50 an electrical signal representative of the oscillation of the mirror 30 as translated into axial motion of the bar 46 through the coil 48.

A circular convex reflection surface 56 is positioned with its optical axis sustantially coincident with the center of the field of view 24 and with its reflecting surface facing the reflecting surface of the mirror 30. The reflecting surface 56 has an area significantly less than the area of the mirror 30. A support 58 rigidly mounts the convex reflecting surface 56 to the mirror frame 40 and is of minimal thickness so as to block insubstantial radiation from the field of view 24 from striking the mirror 30.

A circular concave vertical scanning mirror 60 has its optical axis coincident with the axis 22 and its reflecting surface facing the horizontal scanning mirror 30. Pivots 62 and 64 on opposite edges of the vertical scanning mirror 60 are received through holes in a support 66 to allow oscillatory motion of the mirror 60 about an axis 68 which is perpendicular to the axes 22 and 42.

The support 66 is slidably attached to either the frame 12 or the housing 16 with the direction of sliding motion being parallel to the axis 22 to accomplish a focusing function explained below.

The rocking or oscillating of the concave vertical scanning mirror 60 is accomplished through electromechanical transducers similar to those employed with the mirror 30 and represented by transducer 70 diagrammatically shown outside the section cut of FIG. 1.

A prism 72, having parallel plane reflecting surfaces 74 and 75, is located between the horizontal and vertical scanning mirrors 30 and 60 with the center of the plane reflecting surface 74 on the optical axis 22. The plane reflecting surface 74 is inclined at a 45° angle to the optical axis 22 with the reflecting surface facing substantially toward the horizontal scanning mirror 30. The areas of the plane reflecting surfaces 74 and 75 are substantially smaller than the areas of the horizontal and vertical scanning mirrors.

An infrared detector cell 76 is positioned to receive radiation reflected by the plane reflecting surface 74 from incident radiation substantially parallel to the axis 22. An infrared focusing lens 78 may be placed between the plane reflecting surface 74 and the infrared cell 76 if desired to alter the convergence of radiation reflected from the surface 74 towards the cell 76.

The infrared detector cell 76 is mounted within a housing 80 containing a cryogenic liquid 82 which maintains the temperature of the cell 76 at the extremely low temperatures required for efficient infrared cell operation. The detector housing 80 is secured to the optical scanning system housing 16 and confronts a hole 84 in the frame 12. The hole 84 may be formed of an infrared transparent substance to allow it to completely surround and structurally complete the frame 12 and permit passage of infrared radiation through the frame 12 at any position of rotation within the housing 16.

An optical path exists between the field of view 24 and the infrared detector cell 76 which is produced by a series of reflections. Infrared radiation received over the field of view 24 is first reflected by the horizontal scanning mirror 30 toward the vertical scanning mirror 60. The convex reflecting surface 56 occults and absorbs the portion of this light incident upon the mirror 30 which would otherwise be reflected directly to the plane reflecting surface 74 and onto the detector cell 76. Light incident upon the vertical scanning mirror 60 is reflected with a converging characteristic back toward the horizontal scanning mirror 30 where it is again reflected with substantially all of this secondly reflected radiation incident upon the convex reflecting surface 56. The convex reflecting surface 56 reflects radiation incident upon it back toward the horizontal scanning mirror 30 for a third reflection from the horizontal scanning mirror 30 toward the plane reflecting surface 74. The reflection from the plane reflecting surface 74 is to the infrared detector cell 76. After reflection from the convex reflecting surface 56 convergence of the radiation is reduced so that focus is achieved at the cell 76. The cooperation of the concave and convex reflecting surfaces 60 and 56 allow for minimization of the size of the convex reflecting surface 56 by having the concave reflecting surface 60 strongly converge the reflected radiation to strike within the area of the convex reflecting surface 56. Reduction of the convergence rate is then produced by the convex reflecting surface 56 to lengthen the distance before focus is ultimately achieved at the infrared detector cell 76. Though it is preferable to use a convex shape for the reflecting surface 56, it is of course clear to those skilled in the art that a plane or otherwise optical surface can be used in its place if focal lengths are properly adjusted. Also surfaces 74 and 75 can be separated to provide rotation of surface 75 with frame 12.

Further physical features include a handle 86 attached to the pivot 20 to allow for easy rotation of the frame 12 within the housing 16, electronic circuit cards 88 containing excitation and control electronics described below, and a threaded hole 90 permitting tripod mounting and azimuthal rotation of the housing 16.

Referring now to FIG. 2 there is shown a block diagram of driving electronics for the electro-mechanical transducer coils 34 and for the pickoff coil 48 or for similar transducers 70 for the concave mirror 60. An oscillator 92 generates a linear sawtooth wave which is amplified by a servo control circuit 94 and applied to the input 36 of one electro-mechanical transducer coil 34 in one polarity and applied to the input 38 of the other transducer coil 34 in the opposite polarity such that simultaneous balanced, push-pull forces are exerted upon opposite bars 32 and a linear rocking of the horizontal scanning mirror 30 about the axis 42 is induced without significant flexing of the mirror 30. The output 50 of the electro-mechanical pickoff transducer coil 48 is fed to a second input of the servo control circuit 94 to form a feedback loop whereby the oscillations of the mirror 30 are detected and stabilized to correspond to the linear output of the oscillator 92.

The system of FIG. 2 is used for both the horizontal and vertical scanning mirrors 30 and 60 respectively with the only difference being in the frequency of oscillation of the oscillator 92. For the horizontal scanning mirror 30 a substantially higher frequency is used and is related to the frequency used for the vertical scanning mirror by, for example, a factor of 100 so as to provide a scan with one hundred vertical lines or resolution elements.

In operation, an object within the field of view 24 has the infrared radiation from a spot thereof focused upon the detector cell 76 by sliding adjustment of the vertical scanning mirror 60. The spot whose radiation is focused on the cell 76 is made to follow a horizontal line across the object by the oscillations of the horizontal scanning mirror 30 with each successive horizontal sweep of the spot indexed a predetermined distance in the vertical direction by the slower oscillation of the vertical scanning mirror 60. Because the horizontal scanning mirror 30 must move 100 times faster than the vertical scanning mirror 60 the accuracy of motion of this mirror is more critical. By providing for three reflections from the surface of the mirror 30, however, the rocking angle required of the mirror 30 for a given horizontal scan angle within the field of view 24 is substantially smaller. For example, if a 20° horizontal scanning angle is desired only a 3° rocking angle of the mirror 30 is required. This significantly reduces the stresses upon the mirror 30 and its tendency to flex and distort the optical image as well as its tendency to depart from a linear horizontal scan. Further stress reduction is achieved by the use of a push-pull transducer driving system and further stabilization is provided by feedback from the transducer 48.

While it has been indicated that the vertical scanning mirror 60 uses a similar arrangement of three transducers it can be appreciated that since the requirements for its motional accuracy are substantially lower due to its lower oscillation frequency more conventional torquing methods may be used for the vertical scanning mirror 60 and still achieve a wide angle of vertical scan. Using the above indicated scanning system, it is readily possible to increase the rates of scan over previously possible rates of scan.

In order to provide operation of the FIG. 1 apparatus as a microscope, the prism 72 has a second, opposite reflecting surface 75 which is parallel to the surface 74 but on an opposite face of the prism 72. The surface 75 is placed to receive radiation incident through a selectively closed window 96 from a microscopic specimen 98 and to direct this radiation toward the concave mirror 60. An opaque slide 99 is shown positioned in FIG. 1 to block radiation from the specimen 98 during camera operation but is slidable to block the window 28 and open the window 96 for microscope operation. In this reversed position, indicated in FIG. 3, the radiation through the optical path 14 allows a very small area of a specimen 98 to be scanned by the oscillation of the horizontal and vertical scanning mirrors 30 and 60 respectively, in accordance with the position of the focusing surfaces of mirrors 56 and 60. The detector cell 76 is positioned to receive radiation from the specimen 98 after sequential reflections from surface 75, mirror 60, mirror 30, mirror 56, mirror 30, and surface 74.

The above indicated optical structure is simply converted between low magnification camera operation in FIG. 1 and relatively high magnification microscope operation in FIG. 3 without alteration or adjustment of the optical path or detector by simply providing separate, selectively blocked windows for microscope or camera fields of view. Magnification adjustment is automatically provided by differences in the optical path, between the same optical elements, for the two functions. There results a substantial increase in the range of application for the same detecting instrument without increased complexity.

Referring to FIG. 4 a modification is shown to the structure of FIGS. 1 and 3 to accomplish vertical and horizontal scanning by a detector cell operating in either a camera or microscope mode. A fixed mirror 104 is positioned to receive, at approximately a 45° angle, radiation incident from a field of view 106. The mirror 104 has a central hole or opening 108, the purpose of which will be described below. Reflections of incident radiation by the mirror 104 are directed toward a concave oscillating mirror 110 which is induced to oscillate about an axis perpendicular to the page through transducers 112 operating as indicated above in conjunction with the transducers 70 in FIG. 1 but about an orthogonal axis.

Reflections from the surface of the concave mirror 110 are directed back toward the fixed mirror 104 and pass substantially through the opening 108 therein to strike one of a plurality of mirrors 114 affixed to a drum 116 which is revolved by a motor 118 about an axis substantially aligned with the center of the field of view 106. The mirrors 114 are positioned so as to reflect incident radiation from the opening 108 and direct it back through the opening 108 toward the reflecting surface of a prism 120. The reflecting surface of the prism 120 is positioned to direct incident radiation from the mirrors 114 to a detector 122 which is out of the optical path 124 between the mirrors 110 and 104.

Rotation of the drum 116 and resulting rotation of the mirrors 114 around its periphery in conjunction with the oscillation of the mirror 110 produces a scanning of the angle of incident radiation which is received by the detector 122 through the optical path 124 to provide a rectangular solid angle of coverage for incident radiation received by the detector 122.

By using a plurality of mirrors 114 on the drum 116 it is possible to provide several, sequential scans for each rotation of the drum 116 and to thereby produce more rapid line scanning of the incident radiation. The transducers 112 are operative to produce a slower rate of oscillation for the concave mirror 110 which, in turn, is operative to provide frame scanning of the indicent radiation by producing slight displacement to each line scan from the mirrors 114.

The operation indicated above for the apparatus of FIG. 4 is that of a scanning camera. To provide microscope operation, the apparatus of FIG. 4 is adapted in a manner similar to the adaptation to the apparatus of FIG. 1 to provide microscope operation indicated in FIG. 3. In particular the microscope field of view 126 produces radiation which is incident upon the prism 120 on a reflecting surface opposite to that used in the camera mode. Reflections from the opposite surface are directed to the concave mirror 110 and thence through the hole 108 to the mirrors 114. Reflections from the mirrors 114 are directed through the hole 108 to the first reflecting surface of prism 120 and thence to the detector 122. By the simple opening and closing of various apertures in the structure supporting the FIG. 4 apparatus the camera can be easily changed to a microscope and back to a camera again without altering or adjusting critical elements of the optical path. The placement of the reflecting surfaces on the prism 120 and the positioning of the prism 120 relative to the hole 108 and the mirrors 104 and 110 maintains the proper optical relationships under both camera and microscope operation and prevents spurious reflections during operation as either a camera or microscope. The focusing provided by the concave objective mirror 110 occurs at different points in the optical path 124 for the camera and microscope modes, and, by its point of occurrence is effective to vary the magnification of the optical path in accordance with the magnification requirements of camera and microscope operation.

FIG. 5 diagrammatically indicates an alternative optical path 130 for both the camera and microscope modes. Infrared radiation emanating from the specimen or field of view is incident upon a plane reflecting mirror 132 formed as a thin plane sheet optically reflective on both of sides 134 and 135 and pivoted to assume first and second positions which provide for camera and microscope operation respectively. Radiations reflected from the surface 134 in the first position are directed perpendicularly to the angle of incidence toward a rotating set of reflective vanes 138 formed from the insertion of two flat plane sheets 140 and 142, optically reflective on both sides, and perpendicularly intersecting at an axis of rotation 144. Rotation about the axis 144 is induced by a horizontal drive motor 146 operating through a belt 148 to a pulley 150 on the vanes 138. A structure 152 rigidly securing the vane structure 138 to the horizontal motor 146 is oscillated by a vertical drive motor 154 about an axis 156 passing perpendicularly through the axis 144 and on through the approximate center of the reflecting surface 134.

The radiation reflected from the surface 134 strikes first one reflecting surface of the vane structure 138 and is reflected toward a perpendicularly oriented other surface from which it is reflected back toward the reflecting surface 134 with a substantial part of the returning radiation passing around the periphery of the mirror 132 to a concave reflecting mirror 158 having its optical axis coincident with the axis 156 and fixedly secured to a frame 160 which also pivotally positions the reflecting mirror 132 and the vertical drive motor 154. Reflections from the concave reflecting surface 158 are converged toward the mirror 132 and are thence directed by reflection from the surface 136 toward focus on an infrared detector cell 162.

The rotary motion of the vane structure 138 provides for a smooth horizontal scan and the multiple reflections from its reflective surfaces further amplifies the scan rate so that faster scans can be achieved for the same rotational rate.

It is, of course, possible to adapt the concave reflecting mirror 158 to oscillate similarly to the concave vertical scanning mirror 60 of FIG. 1 and to use the vertical motor 154 as an elevation control rather than a scan control.

With the mirror 132 in the second position, the optical path 130 is reversed so that incident radiation received by the mirror surface 134 is reflected toward the concave mirror 158. Reflections from the mirror 158 are converged toward the vane structure from which they are returned, and by reflection from the mirror surface 136, are directed to the detector cell 162.

With the mirror 132 in the first position, the concave mirror 158, the object lens of the system, is positioned relatively close to the sensitive element 162 in the optical path 130 as is characteristic of camera operation. In the second position of mirror 132, the mirror 158 is relatively closer to the radiation source as is characteristic of microscope operation. The conversion between microscope and camera operation is simply accomplished by pivoting of the mirror 132.

For display of the infrared radiation pattern detected by the optical scanning system an arrangement indicated in block diagram in FIG. 6 may be employed. Horizontal and vertical oscillators 164 and 166 respectively are horizontal and vertical line scanning versions of the oscillator 92 in the system of FIG. 2. These oscillators 164 and 166 have their output connected respectively to X and Y sweep inputs of a cathode ray tube 168. An electron beam from the cathode ray tube 168 is caused to trace a sequence of parallel lines across the face of the display tube corresponding to the lines across the specimen 98 or the field of view 24 by the scanning optics described above. A picture is formed by Z axis modulation of the cathode ray tube 168 in response to the amplified output of an infrared detector cell 170, representing the cells 76, 122 or 162 described above. Amplification is provided by a detector amplifier 172 adapted for selective signal inversion or non-inversion. The resulting image on the screen of the cathode ray tube is a positive or negative radiation picture of infrared radiation over the area scanned.

Referring to FIG. 7 there is shown diagrammatically an alternative form cooling system for an infrared detector cell comprising a detector cell 174 enclosed in housing 176 with an infrared transparent window 178 passing infrared radiation from the environment to a surface of the cell 174. A heat sink 180 leads from the cell 174 to a nozzle 182 having a flow control 184 and communicating through a conduit 186 to a reservoir 188 of liquified cryogenic gas 190 such as helium. Controlled expansion of the liquified cryogenic gas 190 in escaping through the nozzle 184 reduces the temperature at the nozzle to the ultra-low levels required for efficient operation of an infrared detector cell. This cold thermal state is conducted to the cell 174 by the heat sink 180 which is in thermal contact with the nozzle 182.

By using an expanding gas technique for cooling the cell 174 instead of immersing it in a cryogenic liquid as described above, the gravitational sensitivity of the cooling mechanism for the infrared detector cell is reduced allowing the cell and associated cooling system to be rotated over a range of angles in more than one coordinate.

The FIG. 7 cooling system may be applied to any of the above described optical scanning systems.

Having above described detailed preferred embodiments of the present invention, it will occur to those skilled in the art that the invention may be practiced in alternative and modified forms. In particular, the detected radiation may be other than infrared. It is accordingly intended to limit the scope of this invention only as indicated in the following claims.

What is claimed is:

1. An optical scanning system selectively operative as a camera and a microscope, said scanning system comprising:
   a folded optical path having a set of radiation converging and reflecting elements;
   a camera field of view;
   a microscope field of view;
   a radiation detector;
   selectable means for selecting first and second routings with significantly different optical properties for radiation through said set of elements of said optical path whereby said elements are operative in a different sequence in said first and second routings;
   said first routing providing for radiation to traverse said folded optical path from said camera field of view to said radiation detector and providing for placement of said one or more converging elements relatively closer to said radiation detector;
   said second routing providing for radiation to traverse said folded optical path from said microscope field of view to said radiation detector and providing for placement of said one or more converging elements in said second radiation routing relatively closer to said microscope field of view; and
   means for providing scanning by said folded optical path of radiation incident on said radiation detector from said fields of view.

2. The optical scanning system of claim 1 further including means operative to provide rotation of at least one of said fields of view without rotation of said detector.

3. The optical scanning system of claim 1 further including means for adjusting the point of convergence of radiation from said one or more converging elements relative to the position of said detector.

4. An optical scanning system operative as a camera and as a microscope, said system comprising:
   a radiation detector;
   a camera field of view;
   a microscope field of view;
   a folded optical path for radiation between said radiation detector and said camera and microscope fields of view, said folded optical path including:
      a group of optical elements providing reflection of radiation incident upon said group in a direction generally different to the direction of incidence;
      said group of elements having at least one oscillating reflective surface from which a plurality of reflections are made in returning incident radiation;
      at least one reflective, converging optical element; and
   adjustable means for selectively causing radiation incident over said camera field of view and said microscope field of view to traverse said folded optical path from a selected one of said camera and microscope fields of view respectively to said radiation detector and to provide operation of the optical elements in said group in different sequences depending upon the field of view selected;
   said adjustable means, when causing passage of radiation from said camera field of view to said radiation detector, having said at least one converging element optically positioned in the then operative sequence of optical elements relatively closer to said radiation detector;
   said adjustable means, when causing passage of radiation from said microscope field of view in said radiation detector, having said at least one converging element optically positioned in the then operative sequence of optical elements relatively closer to said microscope field of view.

5. The optical scanning system of claim 4 further including means for causing oscillation of said at least one converging element to provide, in conjunction with the oscillation of said at least one reflective surface of said group of elements, scanning of radiation incident on said radiation detector over a solid angle of said camera or said microscope fields of view.

6. The optical scanning system of claim 5 wherein oscillations of said at least one reflective surface of said group of elements is substantially more rapid than the oscillations of said one or more convering elements to produce line scanning of radiation within said camera or microscope fields of view as detected by said radiation detector.

7. The optical scanning system of claim 5 further comprising:
   a display having controllably illuminated and positioned points on a surface;
   means for controlling the illuminations of said points on said surface in response to the radiation incident on said detector; and
   means for controlling the position of said points of illumination on said surface in correspondence with the oscillations of said at least one converging element and said at least one reflective surface.

8. The optical scanning system of claim 4 wherein said group of elements comprises:

a plane mirror; and a convex mirror having its reflective surface positioned to receive and reflect back said radiation incident on said group of elements after a reflection of said plane mirror.

9. The optical scanning system of claim 4 wherein said group of elements comprises a plurality of intersecting plane reflecting surfaces angled relative to each other and rotated about an axis of intersection to provide line scanning radiation incident within said camera or microscope fields of view.

10. The optical scanning system of claim 4 wherein:

said detector is an infrared radiation detector having a sensitive surface;
a reservoir of liquified gas is provided; and
means are provided for expanding said liquified gas in thermal contact with said sensitive surface;
the expansion of said liquified gas maintains the sensitive surface of said infrared detector at extremely low temperatures substantially independent of the orientation of said detector.

11. An optical scanning system comprising:
a radiation detector;
a folded optical path which includes:
  a horizontal scanning mirror having a scanning axis coplanar with the reflecting surface thereof;
  means for rotationally oscillating said horizontal scanning mirror about said axis parallel to the surface of said horizontal scanning mirror and providing said oscillation motion in response to oppositely directed forces of equal strength applied to opposite edges of said horizontal scanning mirror;
  a rotationally supported vertical scanning mirror having a concave reflecting surface;
  said horizontal scanning mirror being disposed along the optical axis of said vertical scanning mirror and inclined at an angle thereto;
  means for rotationally oscillating said vertical scanning mirror about an axis out of parallel with both the scanning axis of said horizontal scanning mirror and the optical axis of said vertical scanning mirror;
  a third reflecting surface having a reflecting area substantially smaller than the reflecting area of said horizontal scanning mirror and positioned, relative to said horizontal scanning mirror, to provide an optical path with said horizontal scanning mirror, which path is operative to cause radiation incident on said horizontal scanning mirror along said optical axis to be returned substantially along said optical axis;
  said horizontal scanning mirror receiving radiation over a solid angle camera field of view provided by the oscillations of said horizontal and vertical scanning mirrors; and reflecting said received radiation toward said vertical scanning mirror; and means for directing radiation from said folded optical path to said detector after being received by said horizontal scanning mirror and reflected towards said concave vertical scanning mirror rereflected with convergence toward said horizontal scanning mirror and sequentially rereflected by said third reflecting surface, said horizontal scanning mirror, and said directing means whereby radiations from objects within said field of view are substantially converged to a focus at said detector.

12. The optical scanning system of claim 11 further comprising:

means for receiving radiation from a microscope field of view and for directing said received microscope field of view radiation toward said vertical scanning mirror substantially along said optical axis;
means for directing radiation from said folded optical path to said detector after being received from said microscope field of view and reflected by said concave mirror and rereflected sequentially by said horizontal scanning mirror, said third reflecting surface, said horizontal scanning mirror, and said directing means whereby radiations from objects within said microscope field of view are substantially converged to a focus at said detector; and
means for selectively blocking reception of radiation from said camera field of view and said microscope field of view whereby said system is operative as either a camera with said concave vertical scanning mirror relatively closer to said detector or a microscope with said concave vertical scanning mirror relatively closer to said microscope field view.

13. The optical scanning system of claim 11 further including means operative to provide rotation of at least one of said fields of view about said optical axis without providing rotation of said detector.

14. The optical scanning system of claim 11 further comprising:

a display having controllably illuminated positioned points on a surface;
means for controlling the illumination of said points on said surface in response to the radiation incident on said detector; and
means for controlling the position of said illuminated points on said surface in correspondence with the oscillations of said vertical and horizontal scanning mirrors.

15. The optical scanning system of claim 11 wherein said means for rotationally oscillating said horizontal scanning mirror further comprises:

electro-mechanical transducers mounted near opposite edges of said horizontal scanning mirror;
means for applying a periodic electrical signal to said transducers to cause the rotational oscillation of said horizontal scanning mirror;
means for sensing the oscillation of said horizontal scanning mirror and providing a corresponding electrical pick-off signal; and
means for providing said electrical pick-off signal as an input to said means for applying said periodic electrical signal in a feedback relationship to provide stabilization of the oscillation of said horizontal scanning mirror in response to said periodic electrical signal, said stabilized oscillation being more consistently representative of a predetermined oscillation characteristic.

16. The optical scanning system of claim 11 wherein said third reflecting surface is a convex reflecting surface providing a reduction in the rate of convergence of radiation reflected from said vertical scanning mirror to said horizontal scanning mirror and thence to said third reflecting surface.

17. The optical scanning system of claim 11 wherein said third reflecting surface is positioned to intercept radiation from said camera field of view which radiation would, in the absence of said third reflecting surface, be directed to said detector after the first reflection from said horizontal scanning mirror.

18. The optical scanning system of claim 11 wherein said vertical scanning mirror is slidably mounted relative to the optical axis thereof to provide adjustment in the position of focus of radiation from said folded optical path.

19. An optical scanning system selectively operable in a microscope of a camera mode, said system comprising:
- a radiation sensitive detector;
- a folded optical path having:
  - a camera field of view;
  - a microscope field of view;
  - a concave mirror;
  - a substantially plane mirror having a hole therethrough which is located approximately on the front facing optical axis of said concave mirror;

said plane mirror being inclined at an angle to the optical axis of said concave mirror to receive radiation from said camera field of view and reflect it substantially along the optical axis of said concave mirror;
  - a rotatable drum having a plurality of mirrors positioned around its periphery and being rotatably positioned to cause, during rotation of said drum, sequential ones of said plurality of mirrors to pass through a condition of perpendicularity with the optical axis of said concave mirror beyond said hole of said plane mirror;
  - means for rotating said drum;
  - means positioned between said concave and said plane mirrors for reflecting radiation towards said detector after reflection from one of said plurality of mirrors and for directing radiation from said microscope field of view toward said concave mirror substantially along the optical axis thereof; and
- means for selectively causing said radiation to traverse said optical path to said radiation detector either exclusively from said camera field of view with said concave mirror relatively closer to said detector or exclusively from said microscopic field of view with said concave mirror relatively closed to said microscope field of view thereby to provide operation of said system selectively in said camera or microscope mode.

20. The system of claim 19 further comprising:
- means for causing the rotation of said drum to be at a predetermined rate; and
- means for causing oscillation of said concave mirror about an axis angled to both the optical axis of said concave mirror and the axis of rotation of said drum;
- said means for causing oscillation of said concave mirror providing an oscillatory rate at a substantially lower frequency than the rate at which adjacent ones of said plurality of mirrors on the periphery of said drum are caused to pass through the condition of a perpendicularity with the optical axis of said concave mirror by the predetermined rate of rotation of said drum;
- the rotation of said drum and the oscillation of said concave mirror cooperating to produce scanning of a solid angle within said camera and microscope fields of view.

21. An optical scanning system for scanning electromagnetic radiations from a field of view comprising:
- a radiation detector;
- a reflecting structure comprising two thin plates perpendicularly intersecting at an axis;
- said plates having radiation reflecting surfaces on one or more sides thereof;
- means for rotating said reflecting structure about an axis of intersection;
- a concave reflecting surface having an optical axis passing through said axis of intersection of said reflecting structure;
- reflecting means pivotally supported in first and second positions and having first and second parallel, oppositely facing reflecting surfaces disposed between said reflecting structure and said concave reflecting surface with the optical axis of said concave reflection surface passing therethrough at an inclined angle, said first and second parallel reflecting surfaces having reflecting areas smaller than the reflecting area of said concave reflecting surface;
- an optical path existing between said field of view and said detector, said optical path leading from said field of view to said first surface of said reflecting means in said first position and thence by sequential reflections to said reflecting structure, said concave reflecting surface, said second surface of said reflecting means and said detector to provide camera operation;
- said optical path leading from said field of view to said second surface of said reflecting means in said second position and thence by sequential reflections to said concave reflecting surface, said reflecting structure, said first surface of said reflecting means, and said detector to provide microscope operation.

* * * * *